Figure 1:
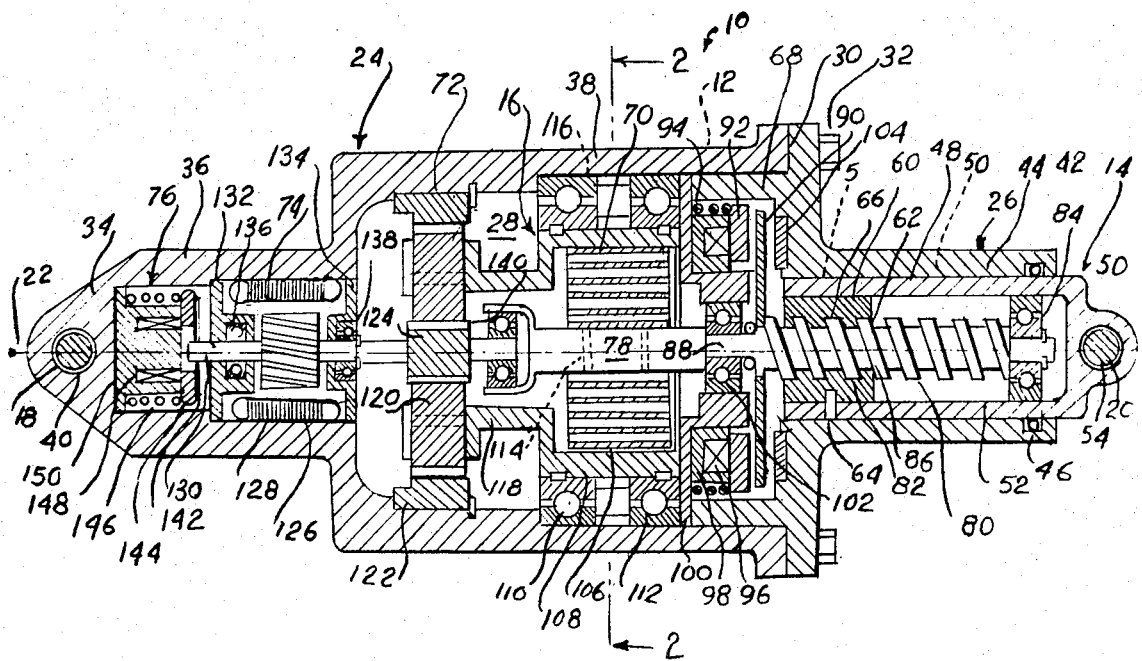

United States Patent
Schindel

[15] 3,693,759
[45] Sept. 26, 1972

[54] THRUST ACTUATOR
[72] Inventor: Arnold Schindel, Fairlawn, N.J.
[73] Assignee: Singer-General Precision, Inc., Little Falls, N.J.
[22] Filed: March 25, 1971
[21] Appl. No.: 127,914

[52] U.S. Cl. .................. 185/40 R, 185/40 B, 60/7 R
[51] Int. Cl. ............................................. F03g 1/00
[58] Field of Search ........ 185/40 R, 43, 40 B; 60/7 A, 60/7 R, 10

[56] References Cited

UNITED STATES PATENTS

| | | | |
|---|---|---|---|
| 2,282,963 | 5/1942 | Haynes | 185/40 R X |
| 2,430,405 | 11/1947 | Millns | 60/7 R X |
| 2,542,164 | 2/1951 | Tatro | 185/40 R X |
| 3,028,726 | 4/1962 | Jenkins et al. | 60/7 R |

*Primary Examiner*—Edgar W. Geoghegan
*Attorney*—S. A. Giarratana and Thomas W. Kennedy

[57] ABSTRACT

An electromechanical thrust actuator including a cylinder having a cavity with a longitudinal axis, a piston received in the cavity for displacement relative to the cylinder along the axis, and electromechanical drive means disposed in the cavity and connecting to the cylinder and the piston for axially displacing the piston relative to the cylinder, wherein the electromechanical drive means includes a ring member disposed in the cavity and movable relative to said cylinder, a torsion spring disposed within the ring member, the torsion spring having an outer end portion connected to the ring member, and having an inner end portion connected to the piston, and a motor adapted to rotate the ring member in order to wind-up the torsion spring, and clutch means engaging the spring inner end and being adapted to suddenly release the spring for instantaneously displacing the piston relative to the cylinder along the axis.

10 Claims, 2 Drawing Figures

PATENTED SEP 26 1972 3,693,759

THRUST ACTUATOR

The present invention relates to a thrust actuator, and particularly to an electromechanical thrust actuator having spring means for storing energy.

A conventional thrust actuator includes a cylinder having a cavity with the longitudinal axis, a piston received in the cavity for displacement relative to the cylinder along the axis, and drive means disposed in the cavity for axially displacing the piston relative to the cylinder. A conventional drive means, which is disposed in the cavity of the cylinder, is a hydraulic type of drive means. The hydraulic drive means uses a fluid which is disposed in the cavity and which bears against the piston for displacement of the piston relative to the cylinder.

One problem with the hydraulic drive means is the need for fluid control means and fluid pumping means for actuating the piston by varying the pressure and volume of the fluid in the cavity.

In accordance with one embodiment of the present invention, the need for a hydraulic drive means is eliminated, and a novel electromechanical drive means is provided. The electromechanical drive means includes a ring member, which is disposed in the cavity and which is movable in a rotary direction relative to the cylinder, and a torsion spring, which is disposed within the ring member, and which has an outer end portion connected to the ring member, and which has an inner end portion connected to the piston. The electromechanical drive means also includes a motor adapted to rotate the ring member relative to the cylinder in order to wind up and store energy in the torsion spring, and includes clutch means, which engages the spring inner end and which is adapted to suddenly release the spring for instantaneously displacing the piston relative to the cylinder along the axis. With such construction according to the above-described, novel embodiment, clutch means can be arranged coaxially with both the torsion spring and the piston for suddenly releasing the inner end of the torsion spring. In addition, with such construction according to this embodiment, an electric motor having planetary gearing can be arranged coaxially with the torsion spring for applying and storing energy in the torsion spring.

Accordingly, it is one object of the present invention to provide an electromechanical thrust actuator, which has a cylinder and piston that enclose an electromechanical drive means, wherein the electromechanical drive means can store energy for release to the piston of the actuator.

It is another object of the invention to provide an electromechanical thrust actuator according to the above-described object, wherein the force vectors, which are caused by axial thrust loads and rotary torque loads, and which occur during transmission of power from the motor through the gearing, and the torsion spring, and thereafter through the clutch unit and the drive shaft to the piston, are all directed along a common longitudinal axis of the cylinder and piston, for the purpose of avoiding eccentric loading and eccentric moments within the actuator.

According to the present invention and in fulfillment of the above-described objects, an electromechanical thrust actuator is provided, which includes a cylinder, a piston disposed in said cylinder, and electromechanical drive means for displacement of said piston relative to said cylinder along a common longitudinal axis, wherein said drive means includes a rotary drive shaft for actuating said piston, clutch means for controlling the rotation of said shaft, spring means for actuating said shaft, gear means connected to said spring means for controlling the energy stored in said spring means, motor means connected to said gear means for selectively actuating said gear means, and brake means for controlling said motor means.

Figure 2:
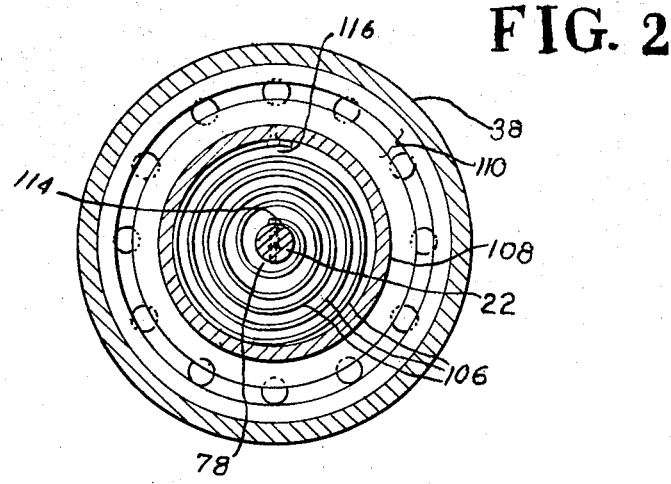

Other objects of the invention will become apparent upon reading the following description and accompanying drawings, wherein like parts are designated by like numerals throughout the several views, and wherein:

FIG. 1 is a sectional view of an electromechanical thrust actuator embodying features of the present invention; and FIG. 2 is a sectional view taken along the line 2—2 of FIG. 1.

Referring to FIG. 1, one embodiment of the present invention is an electromechanical thrust 10. Thrust actuator 10 includes a cylinder 12, a piston 14, which is disposed in said cylinder 12, and electromechanical drive means 16, which actuates said piston 14 for displacement relative to said cylinder 12. Cylinder 12 has a support connector 18, such as a bolt or the like, for connection to a fixed support (not shown). Piston 14 has a driven connector 20 at the opposite end thereof for connection to a driven member (not shown).

Cylinder 12, which has a longitudinal axis 22, includes a left housing member 24 of cylindrical cross section, and a right housing member 26 of cylindrical cross section, which are axially spaced along axis 22. Left housing 24 and right housing 26 form a cavity 28, which is closed at one end by piston 14. Left housing 24 is connected to right housing 26 at a construction joint 30 by a plurality of connectors 32, such as bolts, or the like. Left housing 24 has a left end wall 34, a left cylindrical peripheral wall 36, which is connected to end wall 34, and an enlarged cylindrical peripheral wall 38, which is connected to left cylindrical wall 36. End wall 34 has an aperture 40, which receives support connector 18. Right housing 26 has a right end wall 42, and a right cylindrical, peripheral wall 44, which is connected to right end wall 42. Right end wall 42 has a lubrication seal ring 46, which engages piston 14.

Piston 14 includes a peripheral wall 48 and an end wall 50. Walls 48, 50 enclose an inner space 52, which is in communication with cylinder cavity 28. End wall 50 has an aperture 54, which receives driven connector 20. Piston peripheral wall 48 has a key member 56, which is fixedly connected thereto and which extends radially outwardly therefrom. Key 56 is received in an elongate slot 58, which is disposed in cylinder right peripheral wall 44, for guiding piston 14 in an axial direction. Piston peripheral wall 48 supports an intermediate wall member 60, such as a ball nut, or the like, which has an internal thread 62. Piston peripheral wall 48 has a pin 64, which fixedly connects wall member 60 thereto.

Electromechanical drive means 16 includes a rotary drive shaft 66, which actuates piston 14, a clutch device 68, which controls the rotation of shaft 66, a spring unit 70, which actuates shaft 66, a reduction gear unit 72, which is connected to spring unit 70, a motor unit 74, which is connected to gearing 72 for selectively deflecting spring 70 through gearing 72, and a brake device 76, which controls motor 74. Shaft 66, clutch 68, spring unit 70, gearing 72, motor 74 and brake 76 are coaxially arranged along axis 22.

Drive shaft 66 has an intermediate portion 78, which is connected to spring 70, and a screw portion 80, which is connected to piston 14. Screw portion 80 has an external helical thread 82, which is engaged with piston internal thread 62. Screw portion 80, which may be a ball-screw type of unit, also has a rotary support bearing 84, which is slidably supported by piston wall 48. Bearing 84 also acts as a stop member to limit the extent of displacement of piston 14 in an axially outward direction. Rotation of drive shaft 66 causes axial displacement of piston 14 along axis 22. Screw portion 80 applies an axial force 86 on piston 14 along axis 22 when shaft 66 is rotated. Force 86 is reversed in direction when the direction of rotation of shaft 66 is reversed. Drive shaft 66 also has a coupling member 88, which connects intermediate portion 78 to screw portion 80.

Clutch device 68, which is coaxial with drive shaft 66 along axis 22, includes a shaft plate 90, which is fixedly connected to shaft 66, an armature plate 92, which is axially movable for frictionally engaging shaft plate 90, a compression spring 94, which urges armature plate 92 toward shaft plate 90, a coil 96, which withdraws armature plate 92 from shaft plate 90, when energized, and a pole piece 98 on which coil 96 is mounted. Clutch device 68 also includes a clutch support member 100, which is supported by left housing peripheral wall 38, and which supports clutch pole piece 98 and clutch spring 94. Support 100 has a rotary bearing 102, which supports shaft coupling 88. Armature plate 92, which is axially movable, is supported by right housing peripheral wall 44. Clutch device 68 also has a back-up plate 104, which is mounted on right housing peripheral wall 44, and which is arranged to engage shaft plate 90 when shaft plate 90 is deflected by armature plate 92.

Spring unit 70, which is coaxial with drive shaft 66, includes a torsion spring 106, which connects to drive shaft 66, a ring member 108, which surrounds torsion spring 106, and a pair of bearings. 110, 112, which rotatably support ring member 108. Torsion spring 106 has an inner end portion 114, which is keyed to shaft intermediate portion 78, and has an outer end portion 116, which is keyed to ring member 108. With this construction, energy can be stored in torsion spring 106 by fixedly holding spring inner end 114 while rotating, or winding, spring outer end 116 for a prescribed number of revolutions. Bearings 110, 112, which are supported by cylinder peripheral wall 38, are arranged to permit the common rotation of ring 108 and spring outer end 116.

Reduction gear unit 72, which interconnects motor 74 to spring unit 70, includes an annular flange 118, which is integrally connected to ring member 108 coaxially therewith, a plurality of planetary pinion gears 120, which are rotatably mounted on flange 118, a fixed ring gear 122, which engages pinion gears 120, and a drive gear 124, which is connected to motor 74. Drive gear 124, which is driven at a relatively high speed, transmits power through planetary pinion gears 120 to ring member 108, which is thereby rotated at a relatively slow speed for winding spring 106.

Motor unit 74 includes a stator 126, which is supported by wall 36, and a rotor 128, which is rotatable relative to stator 126. Rotor 128 has a rotor shaft 130, which is fixedly connected to drive gear 124 for turning ring 108. Motor 74 also has a pair of end plates 132, 134 which have respective bearings 136, 138 that support rotor shaft 130. End plates 132, 134 are supported by cylinder wall 36. Rotor 128 also has an end bearing 140, which is supported by drive shaft portion 78. Energization of stator 126 causes joint rotation of rotor 128, rotor shaft 130, drive gear 124 and ring member 108 for winding spring 106. Motor 74 and brake 76 include a limit means (not shown), which limits the number of revolutions applied to ring member 108, and which thereby limits the amount of torque applied to spring 106.

Brake device 76, which is coaxial with motor 74 along axis 22, includes a rotor shaft plate 142, which is fixedly connected to rotor shaft 130, a brake armature plate 144, which is axially movable for engaging plate 142, a brake compression spring 146, which urges armature plate 144 toward shaft plate 142, a coil 148, which withdraws armature plate 144 when actuated, and a brake pole piece 150, on which coil 148 is mounted.

The operation of thrust actuator 10 is indicated hereafter. When brake coil 148 is energized, armature plate 144 is withdrawn in an axial direction away from rotor shaft plate 142 and brake spring 146 is thereby compressed. In this way, motor shaft 130 is released.

Energization of stator 126 causes rotation of rotor 128 whereby rotor shaft 130 rotates drive gear 124. Rotation of drive gear 124 transmits power through planetary gears 120 to ring member 108; and causes a relatively slow rotation and high power input to ring member 108. In this way, torsion spring 106 is wound in a rotary direction.

Rotation of ring member 108 causes outer spring portion 116 to rotate. During the rotation of spring outer portion 116, the inner spring portion 114 is held in a fixed position. In this way, the energy supplied by motor 74 is stored in torsion spring 106.

When clutch coil 96 is energized, clutch armature plate 92 is withdrawn from shaft plate 90. Shaft plate 90 is also thereby withdrawn from back-up plate 104. In this way, shaft portion 78 and screw portion 80 are free to rotate. In addition, tension spring 106 is able to transmit its energy through shaft portions 78, 80 to piston wall 60.

Rotation of screw portion 80 transmits an axial force 86 to piston wall 48 through wall member 60. Force 86 causes piston 14 to move along axis 22. Piston end wall 50 transmits force 86 to driven member 20. In this way, driven member 20 is displaced relative to support member 18 by thrust actuator 10.

While the present invention has been described in a preferred embodiment, it will be obvious to those skilled in the art that various modifications can be made therein within the scope of the invention. It is intended that the appended claims cover all such modifications.

What is claimed is:

1. A thrust actuator including a cylinder, a piston movable along a longitudinal axis relative to said cylinder, and electromechanical drive means connected to said cylinder and to said piston for displacement of said piston relative to said cylinder, said drive means comprising,
   a drive shaft adapted to axially displace said piston,
   clutch means for substantially instantaneous control of the rotation of said shaft,
   spring means connected to said shaft for storing energy and for actuating said shaft by sudden release of the energy thereto,
   gear means connected to said spring means for actuating said spring means,
   a motor having a rotor connected to said gear means for selectively actuating said gear means and for transmitting energy to said spring means, and
   brake means for controlling the acutation of said rotor.

2. A thrust actuator as claimed in claim 1, wherein said cylinder includes a peripheral wall symmetrically disposed about said axis, a first end wall disposed at one axial end thereof, and a second end wall disposed at the opposite end thereof, said walls together enclosing a cavity, and wherein said drive means is disposed within said cavity.

3. A thrust actuator as claimed in claim 2, wherein said piston has guide means engaging said cylinder peripheral wall, said guide means being arranged to permit displacement along said axis of said piston relative to said cylinder and to substantially prevent rotation of said piston relative to said cylinder about said axis.

4. A thrust actuator as claimed in claim 3, wherein said drive shaft has an end portion having an external thread, and wherein said piston has a wall portion having an internal thread arranged to engage said external thread for axial displacement of said piston relative to said cylinder due to rotation of said shaft.

5. A thrust actuator as claimed in claim 4, wherein said spring means includes a torsion spring connected to and surrounding said drive shaft, a ring member connected to and surrounding said torsion spring, and bearing means mounted on said cylinder peripheral wall and rotatably supporting said ring member, and wherein said torsion spring has a radially inner end portion connected to said drive shaft and has a radially outer end portion connected to said ring member.

6. A thrust actuator as claimed in claim 5, wherein said clutch means includes a shaft plate fixedly connected to aid drive shaft, an armature plate axially movable relative to said drive shaft for frictional engagement with said shaft plate, compression spring means for urging said armature plate toward said shaft plate, a coil member for withdrawing said armature plate from said shaft plate upon energization, and pole piece member for supporting said coil member.

7. A thrust actuator as claimed in claim 5, wherein said motor includes a stator mounted on said cylinder peripheral wall, and a rotor rotatable relative to said stator about said longitudinal axis, said rotor having a rotor shaft connected to said torsion spring outer end portion.

8. A thrust actuator as claimed in claim 7, wherein said gear means is arranged to interconnect said rotor shaft and said torsion spring outer end portion, said gear means including an annular flange portion connected to said torsion spring ring member, a plurality of planetary pinion gears rotatably mounted on said flange, a ring gear fixedly mounted on said cylinder peripheral wall and arranged to engage said pinion gears, and a drive gear fixedly connected to said motor shaft and arranged to engage said pinion gears.

9. A thrust actuator as claimed in claim 8, wherein said brake means includes a rotor shaft plate fixedly connected to said rotor shaft, a brake armature plate axially movable for engaging said rotor shaft plate, a compression spring means arranged to urge said armature plate toward said shaft plate, and coil means mounted on pole piece means and arranged to withdraw said armature plate when energized.

10. A thrust actuator as claimed in claim 1, wherein said cylinder, piston, drive shaft, clutch means, spring means, gear means and motor are arranged coaxially along said longitudinal axis for minimizing eccentric loads and eccentric moments therein.

* * * * *